(12) United States Patent
Johnson et al.

(10) Patent No.: US 7,752,016 B2
(45) Date of Patent: Jul. 6, 2010

(54) SYSTEM AND METHOD FOR DATA ANALYSIS

(75) Inventors: Tyler J. Johnson, Murphy, TX (US); Ryan Lee Akkerman, Allen, TX (US); John A. Benavides, Garland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 60 days.

(21) Appl. No.: 11/032,743

(22) Filed: Jan. 11, 2005

(65) Prior Publication Data

US 2006/0155516 A1 Jul. 13, 2006

(51) Int. Cl.
*G06F 11/30* (2006.01)

(52) U.S. Cl. ........................................ 702/186
(58) Field of Classification Search .................. 702/186; 714/5
See application file for complete search history.

(56) References Cited

U.S. PATENT DOCUMENTS

| | | | |
|---|---|---|---|
| 4,791,356 A | 12/1988 | Warren et al. | |
| 5,457,694 A * | 10/1995 | Smith | 714/712 |
| 5,650,734 A | 7/1997 | Chu et al. | |
| 5,778,251 A | 7/1998 | Kuroiwa et al. | |
| 5,825,199 A | 10/1998 | Shelton et al. | |
| 5,828,872 A | 10/1998 | Watkins | |
| 5,850,512 A | 12/1998 | Song | |
| 5,880,671 A | 3/1999 | Ranson et al. | |
| 5,881,224 A | 3/1999 | Ranson et al. | |
| 5,930,482 A * | 7/1999 | Carter et al. | 710/100 |
| 5,949,251 A | 9/1999 | Chambers | |
| 5,956,476 A | 9/1999 | Ranson et al. | |
| 5,956,477 A | 9/1999 | Ranson et al. | |
| 6,003,107 A | 12/1999 | Ranson et al. | |
| 6,009,539 A | 12/1999 | Ranson | |
| 6,041,371 A | 3/2000 | Provence | |
| 6,377,912 B1 | 4/2002 | Sample et al. | |
| 6,389,558 B1 | 5/2002 | Herrmann et al. | |
| 6,397,354 B1 | 5/2002 | Ertekin | |
| 6,587,973 B1 | 7/2003 | Tanaka | |
| 6,618,775 B1 | 9/2003 | Davis | |
| 6,625,783 B2 | 9/2003 | Yamanaka | |
| 6,643,725 B1 | 11/2003 | Kozakai et al. | |
| 6,732,311 B1 | 5/2004 | Fischer et al. | |
| 6,754,852 B2 | 6/2004 | Swoboda | |
| 6,760,864 B2 | 7/2004 | Wood et al. | |
| 6,769,049 B1 | 7/2004 | Bernard et al. | |
| 6,873,183 B1 | 3/2005 | Kaviani et al. | |
| 6,917,220 B2 | 7/2005 | Saito | |
| 6,944,731 B2 | 9/2005 | Bouchard et al. | |
| 7,007,205 B1 | 2/2006 | Yeager et al. | |
| 7,061,272 B2 | 6/2006 | Wilkes et al. | |
| 7,159,083 B2 | 1/2007 | Samuel et al. | |

(Continued)

OTHER PUBLICATIONS http://www.m-w.com/dictionary/signal, p. 1.*

(Continued)

*Primary Examiner*—Tung S Lau (57) ABSTRACT

A system includes a monitoring system that provides at least one signal as a function of at least some data provided on a bus. A measure of performance for the at least some data is adjusted based on the at least one signal. An analysis system is operative to perform logic analysis of the data on the bus as a function of the at least one signal.

33 Claims, 7 Drawing Sheets

U.S. PATENT DOCUMENTS

| | | | |
|---|---|---|---|
| 7,228,472 | B2 | 6/2007 | Johnson et al. |
| 7,237,149 | B2 | 6/2007 | Moyer et al. |
| 7,249,288 | B2 | 7/2007 | Peled et al. |
| 7,348,799 | B2 | 3/2008 | Benavides et al. |
| 2003/0126508 | A1 | 7/2003 | Litt |
| 2004/0124903 | A1 | 7/2004 | Chaudhari |
| 2004/0193962 | A1 | 9/2004 | Johnson et al. |
| 2004/0193976 | A1 | 9/2004 | Slaight et al. |
| 2004/0210782 | A1* | 10/2004 | Hsu .................... 713/300 |
| 2005/0086652 | A1* | 4/2005 | Tian et al. ............. 717/151 |
| 2005/0140390 | A1 | 6/2005 | Wilkes et al. |
| 2005/0166006 | A1 | 7/2005 | Talbot et al. |

OTHER PUBLICATIONS http://www.merriam-webster.com/dictionary/trigger, p. 1, Jun. 5, 2008.*

HP E2910A PCI Exerciser, Technical Data Product Description and Specifications, p. 1-18, Hewlett-Packard Company, Jul. 1996.*

Emulation-Bus Analyzer with deep trace memory (HP 64794), 1993 Hewlett-Packard Company, p. 1-104.*

Agilent Technologies, "Triggering a Logic Analyzer on Complex Computer Buses", The International Engineering Consortium, (date unknown), pp. 1-17, http://www.iec.org, Jan. 11, 2005.

HP E2910A PCI Exerciser, Technical Data Product Description and Specifications, pp. 1-18, Hewlett-Packard Company, Jul. 1996.

Emulation-Bus Analyzer with deep trace memory (HP64794), 1993 Hewlett-Packard Company, pp. 1-104.

http://www.m-w.com/dictionary/signal, p. 1, Dec. 20, 2007.

Non-Final Office Action dated Mar. 21, 2007 for U.S. Appl. No. 11/032,949 in the United States.

Notice of Allowance dated Oct. 26, 2007 for U.S. Appl. No. 11/032,949 in the United States.

Non-Final Office Action dated Jun. 10, 2008 for U.S. Appl. No. 11/033,226 in the United States.

Final Office Action dated Oct. 29, 2008 for U.S. Appl. No. 11/033,226 in the United States.

Non-Final Office Action dated Mar. 19, 2009 for U.S. Appl. No. 11/033,226 in the United States.

Final Office Action dated Sep. 30, 2009 for U.S. Appl. No. 11/033,226 in the United States.

Notice of Allowance dated Mar. 23, 2007 for U.S. Appl. No. 11/032,928 in the United States.

Non-Final Office Action dated May 10, 2006 for U.S. Appl. No. 11/032,743 in the United States.

Final Office Action dated Oct. 17, 2006 for U.S. Appl. No. 11/032,743 in the United States.

Final Office Action dated Jan. 31, 2007 for U.S. Appl. No. 11/032,743 in the United States.

Examiner Interview dated Feb. 26, 2007 for U.S. Appl. No. 11/032,743 in the United States.

Advisory Action dated Apr. 3, 2007 for U.S. Appl. No. 11/032,743 in the United States.

Non-Final Office Action dated May 14, 2007 for U.S. Appl. No. 11/032,743 in the United States.

Final Office Action dated Oct. 18, 2007 for U.S. Appl. No. 11/032,743 in the United States.

Advisory Action dated Jan. 8, 2008 for Serial No. 11/032,743 in the United States.

Pre-Brief Appeal Conference Decision dated Mar. 11, 2008 for U.S. Appl. No. 11/032,743 in the United States.

Examiner Interview dated Apr. 24, 2008 for U.S. Appl. No. 11/032,743 in the United States.

Non-Final Office Action dated Jun. 17, 2008 for U.S. Appl. No. 11/032,743 in the United States.

Final Office Action dated Nov. 19, 2008 for U.S. Appl. No. 11/032,743 in the United States.

Final Office Action dated Mar. 2, 2009 for U.S. Appl. No. 11/032,743 in the United States.

Advisory Action dated May 8, 2009 for U.S. Appl. No. 11/032,743 in the United States.

Notice of Allowance dated Jul. 7, 2009 for U.S. Appl. No. 11/032,743 in the United States.

* cited by examiner

SYSTEM AND METHOD FOR DATA ANALYSIS

CROSS REFERENCE TO RELATED APPLICATIONS

This application is related to the following commonly assigned co-pending patent applications entitled: "SYSTEM AND METHOD TO QUALIFY DATA CAPTURE" (Ser. No. 11/033,226); "SYSTEM AND METHOD TO CONTROL DATA CAPTURE (Ser. No. 11/032,928); "SYSTEM AND METHOD FOR GENERATING A TRIGGER SIGNAL" (Ser. No. 11/032,949), all of which are filed contemporaneously herewith and are incorporated herein by reference.

BACKGROUND

As higher levels of circuit integration are achieved on a single integrated circuit chip or a chipset, there tends to be an increased complexity associated with monitoring and analyzing internal operation of a chip or associated with internal operation of the chipset. One device that can assist some aspects of monitoring and analyzing operation is a logic analyzer. A logic analyzer can take any of several forms, ranging from a simple PC plug-in card to a sophisticated bench-top mainframe that accepts a variety of high-performance plug-in functions.

DETAILED DESCRIPTION

Figure 1:
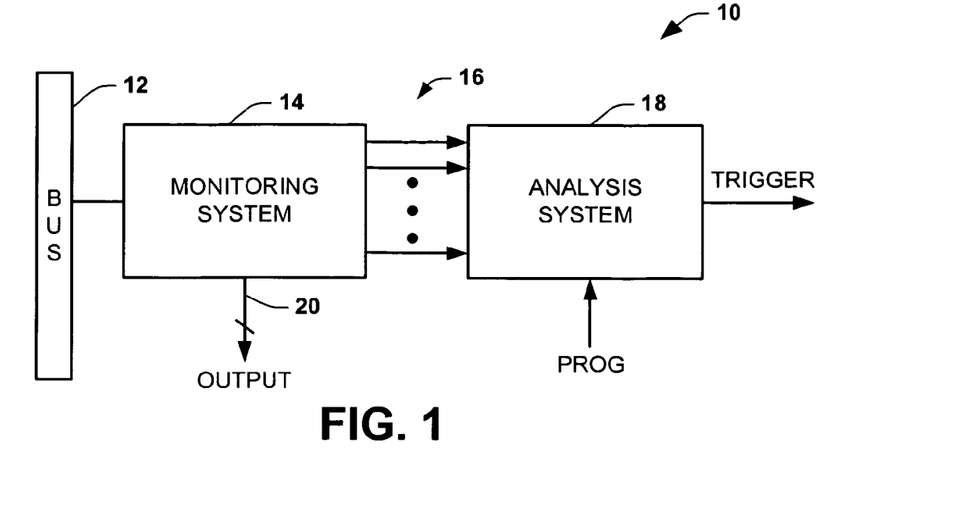
FIG. 1 depicts an embodiment of a system for analyzing data.

FIG. 1 depicts an example of a system 10 that can be utilized to analyze data provided on a bus 12 for data acquisition or storage. The system 10 includes a monitoring system 14 that provides one or more signals 16 to an analysis system 18 as a function of the data on the bus 12. The monitoring system 14 also provides one or more other OUTPUT signals 20 indicative of a measure of performance for the data on the bus 12. The monitoring system 14 can adjust the OUTPUT signals 20 in response to corresponding signals 16 provided to the analysis system 18, so that at least some of the OUTPUT signals 20 are associated with the signals 16. For example, the 16 signals can correspond to enable signals and the OUTPUT signals 20 can correspond to respective counter values (e.g., multi-bit signals) that are incremented or added to in response to the enable signals 16. The analysis system 18 performs logic analysis for the data on the bus as a function of the signal or signals 16 provided by the monitoring system 14. As used herein, the terms "data" and "signal" or "signals" are used interchangeably to identify one or more bits of information that can be communicated from one component to another component as well as between components.

By way of further example, the monitoring system 14 can include a plurality of performance monitors/counters programmed and/or configured to determine whether one or more predefined performance conditions have been met based on the data propagated on the bus 12. For instance, the monitoring system 14 can be programmed to implement arithmetic operations, logic operations, and matching operations, as well as combinations thereof relative to a subset of the data on the bus 12. The performance conditions can be programmable and defined by writing to an associated memory (not shown). The monitoring system 14 can provide the one or more signals 16 as a corresponding multi-bit signal that indicates the results for each performance condition being monitored by the monitoring system. The monitoring system 14, for example, can assert a corresponding bit in the signal 16 for each clock cycle that each given condition for the data on the bus 12 is met.

The analysis system 18 is configured to perform logic analysis relative to the signals 16 and provide one or more TRIGGER signals to control capture of data from the bus 12. For example, the analysis system 18 implement a state machine (e.g., Mealy or Moore) that transitions between states based on the performance conditions implemented by the monitoring system 14. Thus, when the performance conditions are met, (i) the monitoring system 14 can increment counters or tracking systems in response to the signals 16, such as to adjust respective indications of performance corresponding to the counter values and (ii) respective signals 16 can be asserted for a clock cycle to enable logic analysis to be performed by the analysis system 18. The analysis system 18 can provide one or more TRIGGER signals based on the signals 16.

By way of example, the system 10, including the monitoring system 14 and the analysis system 18, can be implemented as hardware within a computer system. The analysis system 18 can be configured (e.g., programmed via system addressable memory) with a program (PROG) vector that defines conditions and a set of possible state transitions associated with the analysis function being implemented. The analysis system 18 can also employ conditional branching to provide for additional state transitions that can occur based on the signals 16 as well as based on the current state of the state machine implemented by the analysis system 18. The TRIGGER signal can also be employed to define a capture session for storing relevant data (e.g., trace data) from the bus 12 according to the analysis of the data performed by the analysis system 18 based on the signals 16.

The bus 12, for example, receives data from one or more sources in an integrated circuit chip or from anywhere in an associated device (e.g., a computer system) in which the system 10 is implemented. The bus 12, for example, can operate as a synchronous bus structure configured to propagate multi-bit data from one or more predetermined locations in an integrated circuit in which the system 10 is implemented. Additionally or alternatively, the bus 12 can receive data from other integrated circuits that may be communicatively coupled with the bus 12, such as within a computer system, as well as from a combination of locations within the same integrated circuit. Those skilled in the art will understand and appreciate various approaches and feed structures that can be utilized to drive the bus 12 with data.

Examples of feed structures (e.g., interfaces) that can be employed to provide data to the bus 12 include bus interface modules. These and other feed structures can obtain data from within a computer system, such as from other bus structures (e.g., processor bus, PCI bus, etc.) or memory, and provide the data to the bus 12. In a multi-processor, multi-cell computer system, for example, the bus 12 can also include data from other cell boards, such as can be provided through a crossbar structure communicatively coupled with the bus 12. In such larger systems, a plurality of the systems 10 can be implemented through the computer system, including one or more of such systems on a single integrated circuit. The bus 12 thus may be referred to herein as an observability bus or a debug bus depending on the context of the system 10.

Figure 2:
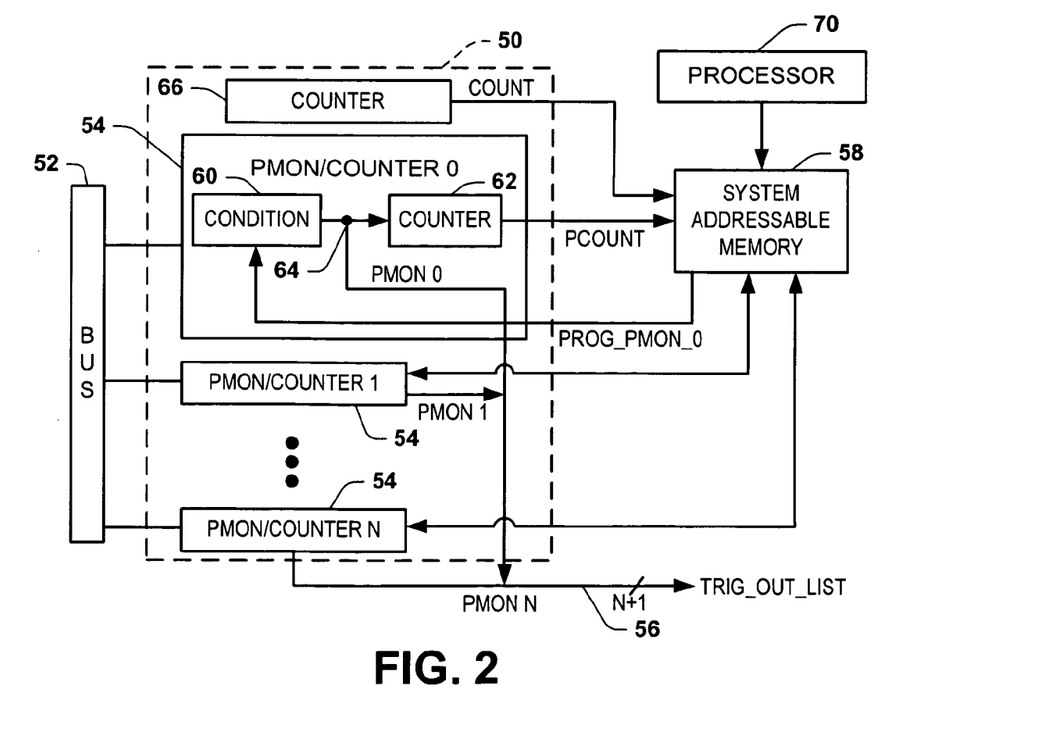
FIG. 2 depicts an embodiment of a monitoring system.

FIG. 2 depicts an example of a monitoring system 50 that can be utilized to monitor performance characteristics associated with data on a bus 52, such as an observability or debug bus. The monitoring system 50 can be implemented as part of a logic analyzer implemented within a computer system. The performance monitoring system 50 includes a plurality of subsystems represented as performance monitor counters (PMON/COUNTER 0 and PMON/COUNTER 1 through PMON/COUNTER N) 54, where N is a positive integer and N+1 denotes the number of PMON/COUNTERS 54. The PMON/COUNTERS 54 collectively drive an output bus 56 corresponding to a multi-bit output signal indicated at TRIG_OUT_LIST. The output bus 56 thus can include N+1 bits, one bit associated with each of the PMON/COUNTERS 54.

Each of the PMON/COUNTERS 54 can be implemented as an arrangement of programmable logic, such as a programmable logic device (PLD), a field programmable gate array, other hardware, or as a combination of hardware and software. Each PMON/COUNTER 54 can be programmed to implement an operation or function for a selected portion or subrange of the data on the bus 52. For instance, each PMON/COUNTER 54 can implement a matching function relative to one or more selected bits of data (e.g., up to all data) from the bus 52. The PMON/COUNTERS 54 can also implement logic functions (e.g., invert, AND, OR, XOR, NOR, AND, XNOR and other logic functions and combinations of functions), arithmetic functions (.e.g., addition, subtraction, multiplication, division, etc.), as well as combinations of logic and arithmetic functions on one or more bits on the bus 52.

System addressable memory 58 is operatively associated with each of the PMON/COUNTERS 54 to program a desired operation or function to be performed relative to data on the bus 52. The system addressable memory 58 can be accessed by a system processor 70 as well as by associated diagnostic utilities (not shown) or other devices that are capable of writing to the system addressable memory 58. The data in the system addressable memory 58 programs a particular operation or function that is performed by each of the respective PMON/COUNTERS 54.

In the example of FIG. 2, PMON/COUNTER 0 is depicted as including a condition block 60 and a counter 62. The condition block 60 implements a performance condition on one or more selected bits of data on the bus 52, which condition can include performing an operation or function on the data, such as an arithmetic function, a logic function or a combination of logic and arithmetic functions. The particular logic and/or arithmetic function performed by the PMON/COUNTER 0 can be programmed according to a PROG_PMON_0 signal from the system addressable memory 58. The PROG_PMON_0 signal can also establish on which data from the bus 52 the performance condition is to be implemented, such as by identifying respective addresses for such data.

For example, the PROG_PMON_0 signal can include one or more bits that set the performance condition (e.g., logic function and/or arithmetic operation) that is performed by the condition block 60 on selected data from the bus 52. As an example, the condition block 60 can include a condition register having a bit associated with each bit on the bus 52. By setting the bits in the condition register, the condition block can provide an enable signal if one or more bits match the data on the bus 52. The condition block 60 provides a condition signal (PMON 0) 64 to the counter 62 based on application of the function or operation on the data. The counter 62 can add a corresponding value to the counter or otherwise increment the counter value based on the output 64. When the performance condition is met, the condition block 60 asserts its output 64 (e.g., a logic HIGH for a clock cycle) corresponding to PMON 0, such as for one or more clock cycles. The condition block 60 can perform the performance condition every clock cycle or at other selected time intervals. As an example, if the performance condition is met over a plurality of clock cycles, the condition block 60 may maintain PMON 0 in the asserted state over the plurality of clock cycles. Alternatively, the condition block 60 can toggle the PMON 0 output signal. The PMON 0 corresponds to part of the output bus 56 that forms TRIG_OUT_LIST.

The output condition signal PMON 0 can also adjust a measure of performance associated with the data being monitored by the condition block. In the example of FIG. 2, the counter 62 adjusts its counter value based on PMON 0 according to whether the performance condition implemented by the condition block 60 is met in a given clock cycle. The counter 62 in turn provides a PCOUNT signal having a value indicative of the measure of performance monitored by the respective performance monitoring subsystem. For example, the PCOUNT signal can have a value indicative of the number of times the performance condition implemented by the condition block 60 is met, such as during a given capture session or over a plurality of sessions. The counter 62 can be reset, when needed.

For purposes of simplicity of explanation, the internal contents of the other PMON/COUNTER 1 through PMON/COUNTER N have been omitted from FIG. 2, although it will be understood that each can be similarly configured as shown and described with respect to PMON/COUNTER 0. That is, each PMON/COUNTER 54 can be programmed and/or configured to perform respective performance conditions that drive associated counters based on whether the conditions are met. Each time a counter is adjusted based on a performance condition, a corresponding PMON output from the respective PMON/COUNTER 54 is also asserted in the TRIG_OUT_LIST signals on the bus 56 (e.g., for a clock cycle). Each of the N bits on the bus 56 associated with the TRIG_OUT_LIST signals thus provides an indication of performance associated with a selected part of the data on the bus 52 according to the performance conditions implemented by condition blocks in each of the PMON/COUNTERS 54. While the PMON/COUNTERS 54 have been described as being programmable, it is also contemplated that one or more of the PMON/COUNTERS 54 can be hardwired to implement fixed performance monitoring conditions.

The system 50 can also include another general counter 66 that increments a counter value to provide a reference COUNT signal with each clock cycle (or on some other periodic interval). The value of the counter 66 thus can be compared or evaluated relative to the PCOUNT signal from the counter 62 (as well as to counters of the other PMON/COUNTERS 54) to ascertain an indication of the frequency that the respective performance conditions implemented by the condition block 60 (and other condition blocks of the other PMON/COUNTERS 54) are met. For example, the processor 70 can employ the counter while executing instructions corresponding to a diagnostic utility. The value of the counter 66 can also be employed to control the PMON/COUNTERS 54.

Figure 3:
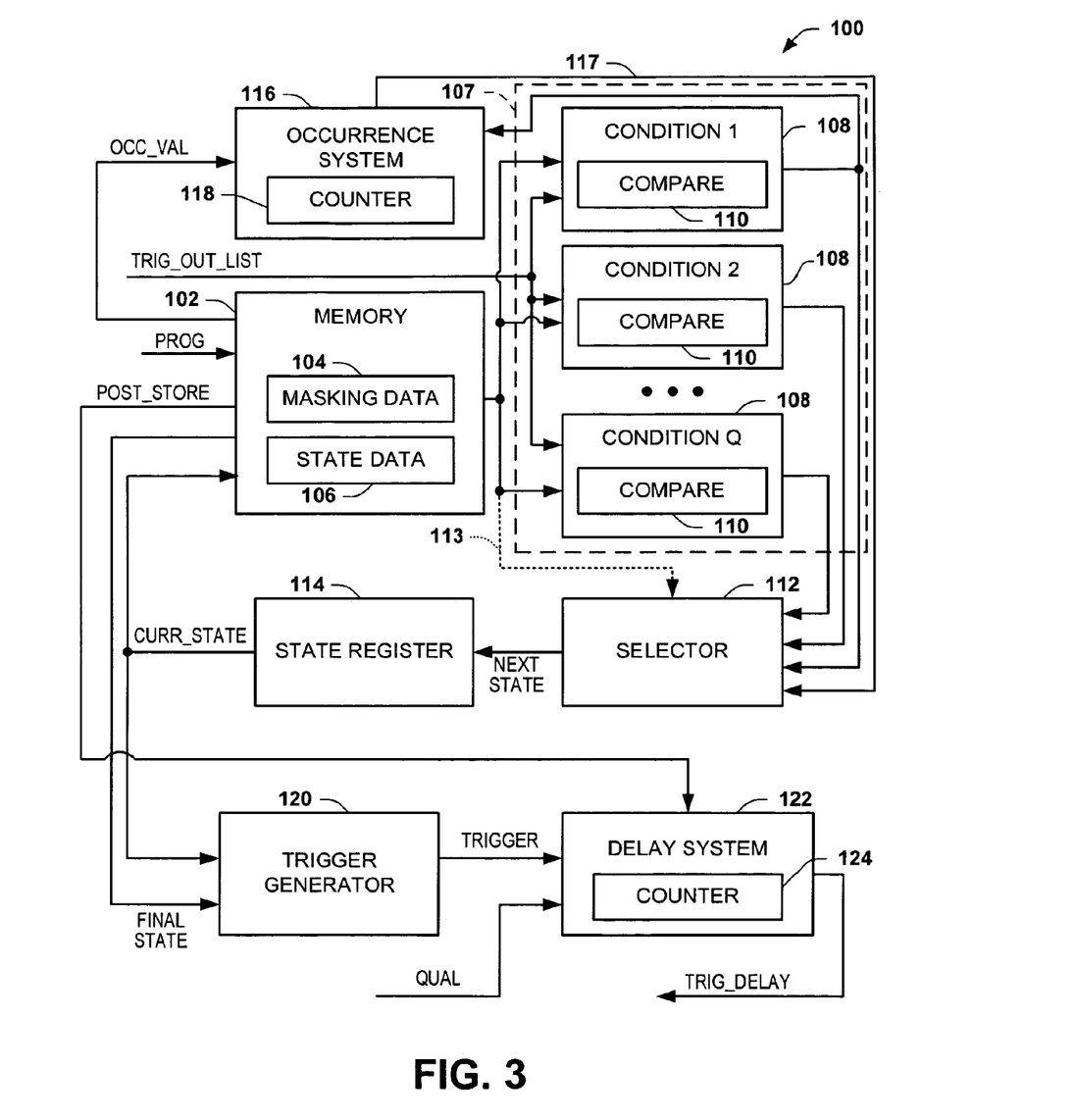
FIG. 3 depicts an embodiment of an analysis system.

FIG. 3 depicts an example of an analysis system 100 that can be utilized for logically analyzing data provided on a bus, such as a multi-bit synchronous observability or debug bus. The analysis system 100 employs a memory 102 that stores masking data 104 that defines one or more conditions for controlling transitions of a state machine. The memory 102 can also include state data 106 that defines states and transitions among the available states. For example, the memory 102 can be any type of system addressable memory (e.g., a register array, such as a control and status register) that can be written to, such as from a system processor of a computer system in which the analysis system 100 is implemented. The memory 102 can also be read from to drive state transitions based on the TRIG_OUT_LIST.

The analysis systems 100 implements a state machine 107 that transitions among a plurality of available states based on the TRIG_OUT_LIST, which describes performance characteristics of the data on the bus. Those skilled in the art will understand and appreciate various ways in which the analysis system 100 can be implemented to analyze the performance information provided in the TRIG_OUT_LIST signals. The analysis system 100 can include one or more condition components 108 that control state transitions for the state machine 107 from a current state (CURR_STATE) to a NEXT STATE. The CURR_STATE can include one or more bits (e.g., a three bit value) that determine how data propagated on the bus (e.g., the debug bus) will be analyzed and captured. The sequence of possible states, transitions between states, and functions perform by each condition component 108 can be programmed as a state transition vector in the memory 102 defined by the masking data 104 and the state data 106.

In the example of FIG. 3, the condition components 108 are represented as CONDITION 1, CONDITION 2 and CONDITION Q, where Q is a positive integer (Q≧1) denoting a number of conditional branches and functions that can be implemented for each state. Those skilled in the art will understand and appreciate various types of conditions and other numbers of condition components 108 can be utilized in the analysis system 100. The condition components 108, for example, correspond to conditional logic and conditional branches performed on the TRIG_OUT_LIST to control state transitions for the state machine 107. The condition components 108 employ compare blocks (e.g., comparator circuitry) 110 to implement their respective functions on the TRIG_OUT_LIST according to masking data 104 read from the memory 102.

As an example, the compare block 110 for each condition component 108 can implement bit-wise masking (or matching) relative to the performance condition data represented by the TRIG_OUT_LIST. The compare blocks 110 thus can implement matching each cycle based on a masking vector stored as the masking data 104. The vector in the masking data 104 can be different for each compare block 110. The masking data 104 further can be fixed for a given capture session or the masking data can vary over a capture session, such as by employing different masking data for some or all of the available states. When the masking data for a given condition component 108 matches the TRIG_OUT_LIST, the condition component provides a corresponding output to a selector 112 indicating that the condition has been met (e.g., the vector is enabled).

Each of the condition components 108 provides an output to the selector 112. The selector 112 is operative to identify the NEXT STATE for the state machine based on the outputs from the conditions components 108. The condition components 108 can be employed as hierarchical elements that control state transitions. For example, the condition components 108 can function as a priority encoder that implements state transitions based on the CURR_STATE and based on the TRIG_OUT_LIST. As a next state data 106 priority encoder, the selector 112 can set the NEXT STATE according to which of the condition components 108 is enabled and the priority assigned to the respective condition components 108. Accordingly, the condition components 108 may operate as separate conditional branches that can be employed to implement predefined state transitions (e.g., preprogrammed as the state data 106) for the state machine based on the comparing the TRIG_OUT_LIST relative to the corresponding masking data 104 associated with each conditional branch. The selector 112 can receive an indication of the next state from the enabled condition component 108 or, alternatively, read the data from the memory 102, indicated by dotted line 113.

By way of further example, the following TABLE I provides a truth table representation of possible state transitions that can be implemented by the condition components 108 according to the results of the comparisons performed by the respective compare blocks 110. The entries in TABLE I, for example, correspond to the outputs of the three condition components 108 shown in FIG. 3. For instance, CONDITION 1 corresponds to a first or highest priority condition (e.g., an "if" condition), CONDITION 2 corresponds to a next highest priority condition (e.g., an "else if" condition) and CONDITION Q corresponds to a lowest priority condition (e.g., another "else if" condition). The values of the outputs for each of the respective condition components 108 thus indicates whether the respective vectors (stored in the masking data 104) are enabled (denoted by a logic "1") or are disabled (denoted by a logic "0"), such as by the compare blocks 110 comparing the TRIG_OUT_LIST with corresponding masking data 104. In TABLE I, the letter "X" denotes a "don't care" state associated with the respective outputs of condition components 108. When none of the conditions are met (e.g., all conditions equal 0), the selector 112 maintains its current state. Those skilled in the art will understand and appreciate various ways in which the functionality similar to that demonstrated in TABLE I can be realized to implement a state machine within a computer system, including hardware and/or software, based on the teachings contained herein.

TABLE I

| COND 1 | COND 2 | COND Q | RESULT |
|---|---|---|---|
| 0 | 0 | 0 | Load CURR_STATE |
| 0 | 0 | 1 | Load CONDITION Q NEXT STATE |
| 0 | 1 | X | Load CONDITION 2 NEXT STATE |
| 1 | X | X | Load CONDITION 1 NEXT STATE |

The selector 112 provides the NEXT STATE information to a state register 114. The state register 114 thus provides an indication of the current state as the CURR_STATE signal. As mentioned above, the CURR_STATE can be employed to select a next available state from the state data 106 as well as (optionally) redefine the masking vector to be applied be each of the condition components 108 for the current state of the state machine 107.

The system 100 can also include an occurrence system 116 that is operative to require multiple hits or occurrences by one or more given condition components (e.g., CONDITION 1) 108 before enabling the selector 112 to transition to a next state for the given condition component. For purposes of explanation, the example of FIG. 3 assumes that the occurrence system 116 applies to the CONDITION 1 only, although other occurrence requirements can also be utilized in conjunction with other conditional branches of the analysis system 100. The occurrence system 116 thus provides an occurrence enable signal 117 to the selector 112 indicating whether the predefined number of occurrences has been met for the given condition component (e.g., CONDITION 1) 108. The selector 112 thus can select the next state assigned to CONDITION 1 only if, for example, the occurrence enable signal 117 indicates the number of occurrences has been met.

As an example, the occurrence system 116 includes a counter 118 that is operative to count occurrences when the compare block 110 for CONDITION 1 indicates that the corresponding masking vector is met. The counter 118, for example, can track the number of occurrences during a capture session or the number of occurrences for the CURR_STATE. The memory 102 can provide an occurrence value (OCC_VAL) to the occurrence system 116. The value of OCC_VAL defines a number of one or more occurrences that are required before the masking data vector associated with CONDITION 1 can enable the selector 112 to load the next state vector associated with CONDITION 1. The same or different occurrence values can be programmed for different states of the state machine. The occurrence system 116 compares OCC_VAL relative to the value provided by the counter 118 and provides the occurrence enable signal to the selector 112 based on the comparison. The occurrence enable signal masks off the next state vector associated with CONDITION 1 until the OCC_VAL is met by the output of the counter 118. Accordingly, until the occurrence requirements associated with the CONDITION 1 have been met, the next state of the state machine will correspond to one of the next state vectors associated with one of the other condition components 108.

The analysis system 100 also includes a trigger generator 120. The trigger generator 120 is operative to generate the TRIGGER signal based on the CURR_STATE relative to a predefined FINAL STATE, which can be stored in the memory 102. The trigger generator 120 can also include additional logic to force the trigger generator to provide the TRIGGER signal. Those skilled in the art will understand and appreciate various ways in which a TRIGGER signal can be generated, such as based on desired performance characteristics and design requirements.

The system 100 also includes a delay system 122 that is operative to generate the TRIG_DELAY signal based on the TRIGGER signal and a store qualification (STOR_QUAL) signal. As an example, the delay system 122 includes logic that ANDs the TRIGGER signal with an inverted version of the TRIG_DELAY signal and the STOR_QUAL signal. A counter 124 is enabled based on the output of the logic so as to increment its value provided that the TRIG_DELAY signal is not asserted and both the STOR_QUAL and TRIGGER signals are asserted (e.g., corresponding to qualified trigger events).

The delay system 122 compares the output of the counter 124 relative to a predefined counter value, indicated at POST_STORE. The POST_STORE value can be a predefined value that is read from corresponding system addressable memory 102 for implementing a desired trigger delay. The POST_STORE value can be programmed, such as for a given capture session, to define a trigger delay value that sets a data capture point relative to a corresponding trigger event (e.g., when the TRIGGER signal is asserted).

For example, a corresponding data capture system can capture a set of data that can be stored in a capture buffer prior to a trigger event based on a minimum POST_STORE value (e.g., POST_STORE=0). In such a scenario, the data capture system would turn off and stop storing data from the bus at a trigger event. Alternatively, the POST_STORE value can set the trigger delay to cause the data capture system to store all data after a trigger event based on a maximum POST_STORE value. In this latter scenario, the capture buffer would fill the capture buffer with data from the bus beginning on or after a trigger event. Depending on the size of the counter 124, a POST_STORE value may also be set to store future data, such as by reading data from the data capture system and storing the data in memory over a plurality of cycles after the trigger event. Another alternative is to store a set of data based on the POST_STORE value in a capture window (or windows) that resides within any one or more of the preceding data capture scenarios. The TRIG_DELAY signal thus can be provided to a data capture system along with the STOR_QUAL signal for controlling operation of the data capture system, such as described herein.

Figure 4:
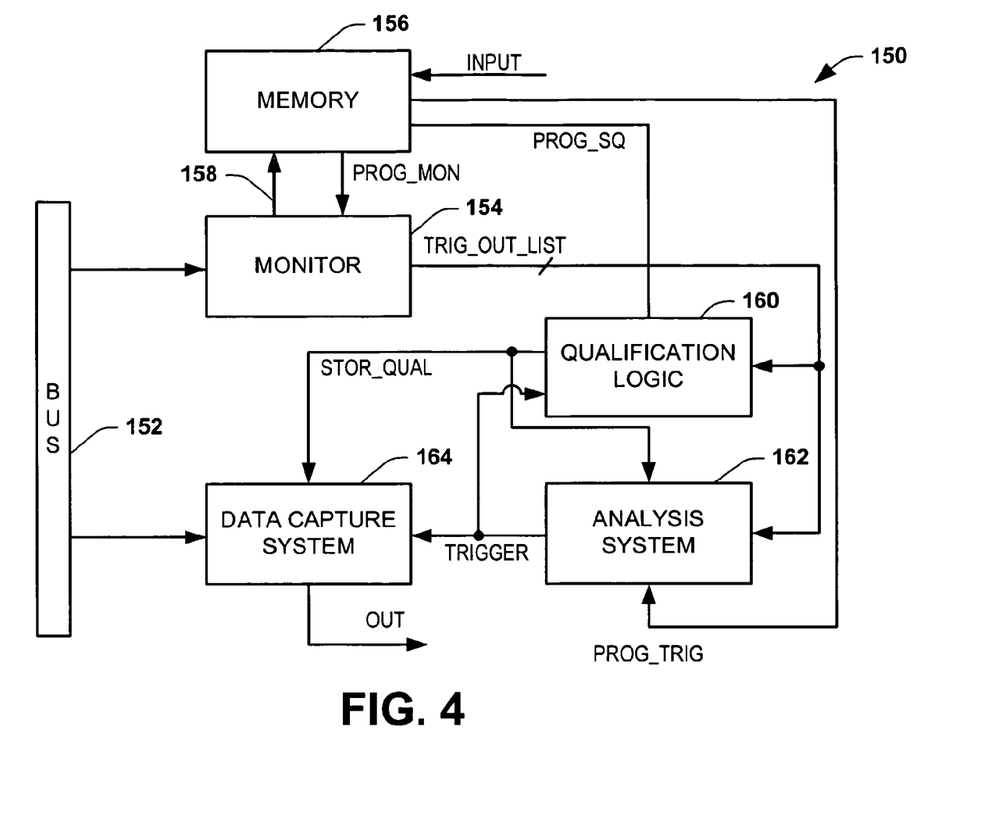
FIG. 4 depicts an embodiment of a logic analyzer

FIG. 4 depicts an example of a logic analyzer 150. The system 150 is utilized to acquire data from a data bus 152. The bus 152, for example, can receive data from one or more sources in an integrated circuit chip or from anywhere in an associated apparatus or system, including from other integrated circuits, in which the system 150 is implemented. Those skilled in the art will understand and appreciate various approaches and feed structures that can be utilized to drive the bus 152 with data.

A monitoring system 154 receives and monitors data provided on the bus 152. The monitoring system 154 can include a plurality of performance monitors/counters programmed and/or configured to determine whether certain performance conditions have been met based on the data propagated on the bus 152 (see, e.g., FIG. 2). For instance, the monitoring system 154 can be configured to implement arithmetic operations, logic operations, and matching operations, as well as combinations thereof relative to a subset of the data on the bus 152. The monitoring system 154 can provide a corresponding multi-bit output (TRIG_OUT_LIST) that indicates the results of each performance condition being monitored. The monitoring system 154, for example, can assert a corresponding output bit in the TRIG_OUT_LIST signal for each clock cycle that a given condition for a predetermined subset of some or all of the data bus 152 is met.

The performance conditions can be programmable and defined by writing to an associated memory 156. The associated memory 156 can be one or more system addressable memory blocks (e.g., an array of control and status registers) that is programmable by one or more program (INPUT) signals. The INPUT signals can be employed to set desired logic, matching and/or arithmetic operations that are to be performed by the monitoring system 154. The memory 156 can provide (e.g., the monitoring system can read) PROG_MON signals to program each of the performance conditions monitored by the monitoring system 154. There can be a separate block of the memory 156 associated with programming each performance condition that the monitoring system 154 is to evaluate. For example, corresponding blocks in the memory 156 may be programmed by an internal processor (e.g., via system addressable memory) or from an external device or system utility by writing to predetermined address locations in the memory 156 that are assigned to respective performance monitoring circuits of the monitoring system 154.

The monitoring system 154 provides the TRIG_OUT_LIST signals to a qualification system 160 and to an analysis system 162. The TRIG_OUT_LIST signals can be provided as data over a multi-bit bus that includes a respective output for each performance condition that is monitored by the monitoring system 154. For example, when a particular condition being implemented by the monitoring system 154 is met, a corresponding bit (or bits) in the TRIG_OUT_LIST signals can be asserted by the system 154 for a clock cycle. The assertion of the corresponding bit (or bits) in the TRIG_OUT_LIST signals can correspond to incrementing a corresponding counter or adjusting some other measure of performance in a respective performance monitoring circuit of the monitoring system 154. Thus, the multi-bit output TRIG_OUT_LIST thus provides an indication as to whether certain conditions have been met in the data provided on the bus 152. Those skilled in the art will understand and appreciate that the monitoring system 154 can be programmed and configured to monitor any number of one or more conditions associated with the data on the bus 152.

The qualification logic 160 performs matching and qualification functions relative to the TRIG_OUT_LIST provided by the monitoring system 154. The qualification system 160 provides a STOR_QUAL signal to an associated data capture system 164 to identify whether data should be captured from the data bus 152. The qualification system 160, for example, can be programmed via a PROG_SQ signal, such as to perform qualification logic or matching functions on a selected group or subgroups of the TRIG_OUT_LIST data. The matching function, for example, can implement a matchable masking function that determines whether data should be captured from the data bus each clock cycle based on the results of the variables represented by the TRIG_OUT_LIST signals. The matching function can thus provide the STOR_QUAL signal to identify one or more patterns associated with the results of the performance conditions being monitored by the monitoring system 154.

The analysis system 162 is configured to perform internal logic analysis relative to the performance monitor TRIG_OUT_LIST data and provide one or more TRIGGER signals to control a capture session for acquiring data from the bus 152. For example, the analysis system 160 can be implemented as a state machine structure (e.g., Mealy or Moore) that transitions between states based on the performance conditions implemented by the monitoring system 154. As described herein, when the performance conditions are met, respective data in the TRIG_OUT_LIST can be asserted for a clock cycle based on which the analysis system 162 performs logic analysis. The analysis system 162 can provide one or more TRIGGER signals to the data capture system 164 based on the TRIG_OUT_LIST signals and the STOR_QUAL signal. The one or more TRIGGER signals can also be provided to the qualification logic block 158, as mentioned above.

The analysis system 162 can be configured (e.g., programmed via system addressable memory) with a vector (PROG_TRIG) that defines a set of possible conditions and state transitions associated with the analysis function being implemented. The analysis system 162, for example, can also employ conditional branching based on the TRIG_OUT_LIST data as well as based on the current state of the state machine implemented by the analysis system 162. The analysis system 162 can also control how the data capture system 162 captures data relative to a trigger event.

In a further example, the analysis system 162 can be programmed (e.g., via the PROG_TRIG signal) to adjust the timing of data capture relative to a trigger point, such as when the TRIGGER signal is asserted. For example, the PROG_TRIG signal can set one or more entries in system addressable memory (e.g., a register array or other memory) to set a trigger delay value that is utilized to define whether the capture buffer is to store data before the occurrence of a trigger event, after the occurrence of a trigger event or within some window that includes a trigger event. The window, for example, can vary based on the size of the buffer employed by the data capture system 164 or other memory utilized in conjunction with the buffers used to store the data from the bus 152.

Trigger events or conditions can occur when the analysis system 162 transitions into one or more of the programmable states of the analysis system, which state(s) is designed to cause the TRIGGER signal to assert. For example, the state machine can include a FINAL STATE that causes the analysis system 162 to assert the trigger signal. Additionally, a predetermined number of one or more occurrences of a given condition can be required before transitioning to a next state for the given condition.

The data capture system 164 is operative to store data from the bus 152 based at least in part on the STOR_QUAL signal from the qualification logic and based on the TRIGGER signal(s) provided by the analysis system 162. The data capture system 164 includes control logic that can be set to define a quantity of data that is to be stored, a type of data that is to be stored and how data will be stored relative to the TRIGGER signal. For example, the control logic of the data capture system 164 can include an arrangement of hardware arranged to activate the data capture system 164 for storing a set of data from the bus 152 in response to the STOR_QUAL and TRIGGER signals. As a further example, the analysis system 162 can provide the TRIGGER signal as including both a trigger signal and a trigger delay signal. The trigger delay signal that identifies a value for a particular number of bits prior to or after the occurrence of a trigger condition that are to be stored in the data capture system 164. The data capture system 164 can provide its corresponding output signal (OUT) to associated memory, such as system addressable memory, which can be read by a system processor.

Those skilled in the art will appreciate various types of memory structures (e.g., register arrays, buffers, RAM, cache and the like) that can be utilized for inputting program data to various parts of the system 150 and for storing output OUT data from the system 150. Additionally, the system 150, including the monitoring system 154, the qualification system 158, the analysis system 162 and the data capture system 164 (or at least portions thereof) can be implemented as an application specific integrated circuit (ASIC). The ASIC can be implemented as an integrated logic analyzer internal to a computer system.

Figure 5:
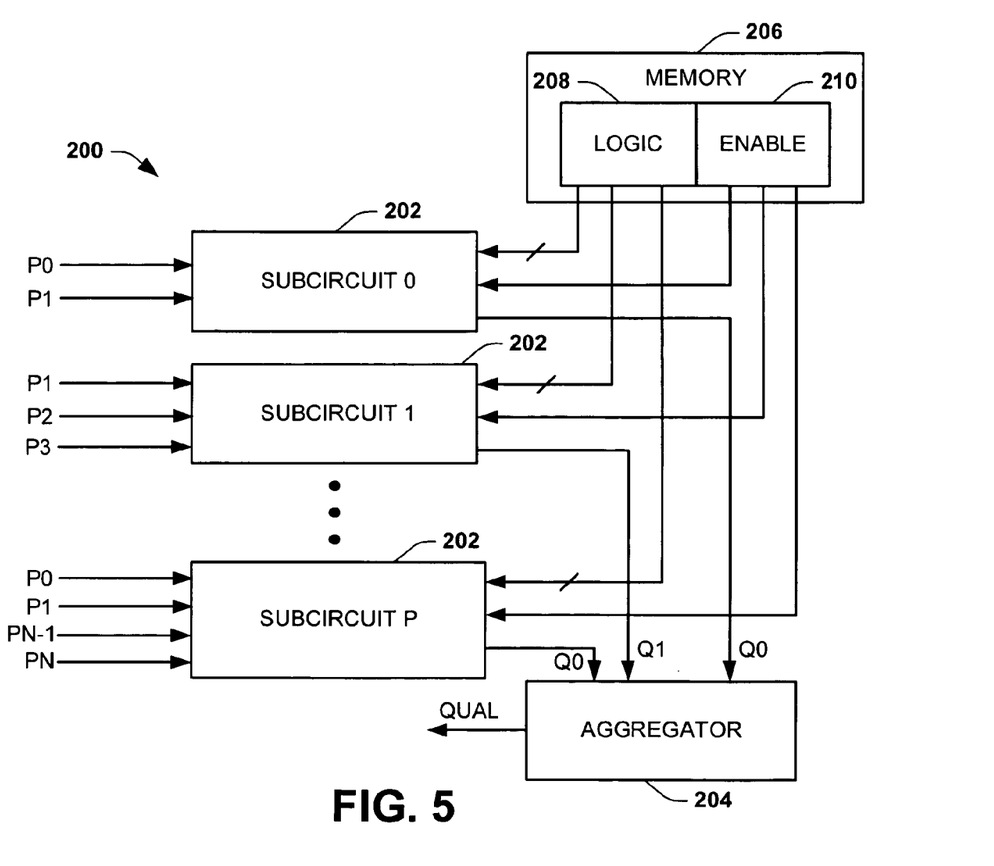
FIG. 5 depicts an embodiment of a qualification system.

FIG. 5 depicts an example of a qualification system 200 that includes a plurality of separate subcircuits 202. For example, the subcircuits 202 can be Boolean subcircuits: Boolean subcircuit 0, Boolean subcircuit 1 through Boolean subcircuit P, where P is a positive integer and P−1 denotes the number of subcircuits. Each of the subcircuits 202 is operative to provide a corresponding qualification signal, indicated at Q0, Q1 and QP, as a function of corresponding input signals, indicated generally at P0 through PN, where N−1 denotes the number of signals. P and N may be the same or different. The signals P0-PN can define variables for purposes of the Boolean operations performed by each of the subcircuits 202. As described herein, the input signals P0-PN to the qualification system 200 can represent values (e.g., one or more bits) of respective performance conditions for data on an associated bus.

It will be appreciated that one or more of the same signals P0-PN can be qualified by more than one of subcircuits 202 concurrently. This affords an increased set of possible Boolean operations that can be performed by the qualification system 200 over the set of variables corresponding to signals P0-PN. For example, since more than one of the signals (e.g., P0 and P1) are provided to different subcircuits, respective Boolean operations can be performed concurrently the signals and on the compliment (or inverse) of such signals. For those signals that occur only a single time as inputs to the qualification system 200, Boolean operations can be performed on either each of the signals or the compliment (or inverse) of the signals.

By way of example, each of subcircuits 202 can perform a corresponding Boolean operation by performing matching between predefined data and the variables defined by the input signals that are provided to the respective subcircuit. Thus, the qualification signals Q0, Q1 through QP vary as a function of the Boolean operation performed by each of the subcircuits on the respective variables. An aggregator 204 aggregates the qualification signals Q0, Q1 through QP to provide a corresponding aggregate qualification signal, indicated at QUAL. The QUAL signal can be a single bit or a multi-bit value that varies based on the respective qualification signals Q0, Q1 through QP.

Memory 206 can also be provided to set or configure the qualification system 200. For example, the memory 206 can be implemented as system addressable memory (e.g., an array of control and status registers). The memory 206 can be programmed to set logic data 208 that defines Boolean operations performed by the subcircuits 202 on the respective variables defined by the corresponding input signals P0-PN. As an example, the logic data 208 can correspond to a vector of logic values for masking the respective input signals provided to each of the subcircuits 202. The logic data 208 thus can be set to determine whether the values of the respective input signals match predetermined logic values, as stored as logic data in the memory 206.

The memory 206 can also include enable data 210 to selectively enable each of the plurality of subcircuits 202. The enable data 210 thus can be set for each of the subcircuits 202 to enable or disable the subcircuit to control whether a predetermined Boolean operation is performed relative to a selected subset of some or all of the input signals P0-PN. The Boolean operations implemented by the subcircuits 202 can be fixed for a data capture session by programming the logic data 208 and the enable data 210 for qualifying data capture over a plurality of cycles. Alternatively, the memory 206 can be reprogrammed during a capture session, such as to vary the Boolean functions performed by the subcircuits 202 over time. If the logic data 208 or the enable data 210 are to be reprogrammed during a capture session, the process should be configured to accommodate the time for re-programming the memory 206.

The memory 206 can be programmed, for example, by employing a system processor to address corresponding memory address locations associated with the logic data 208 or the enable data 210 that is to be programmed. Those skilled in the art will understand and appreciate other ways to program the memory 206, which can include but are not limited to configuration utilities (e.g., via a serial or JTAG interface communicatively coupled to the memory) or by other configuration tools or by scan-on-the-fly.

Figure 6:
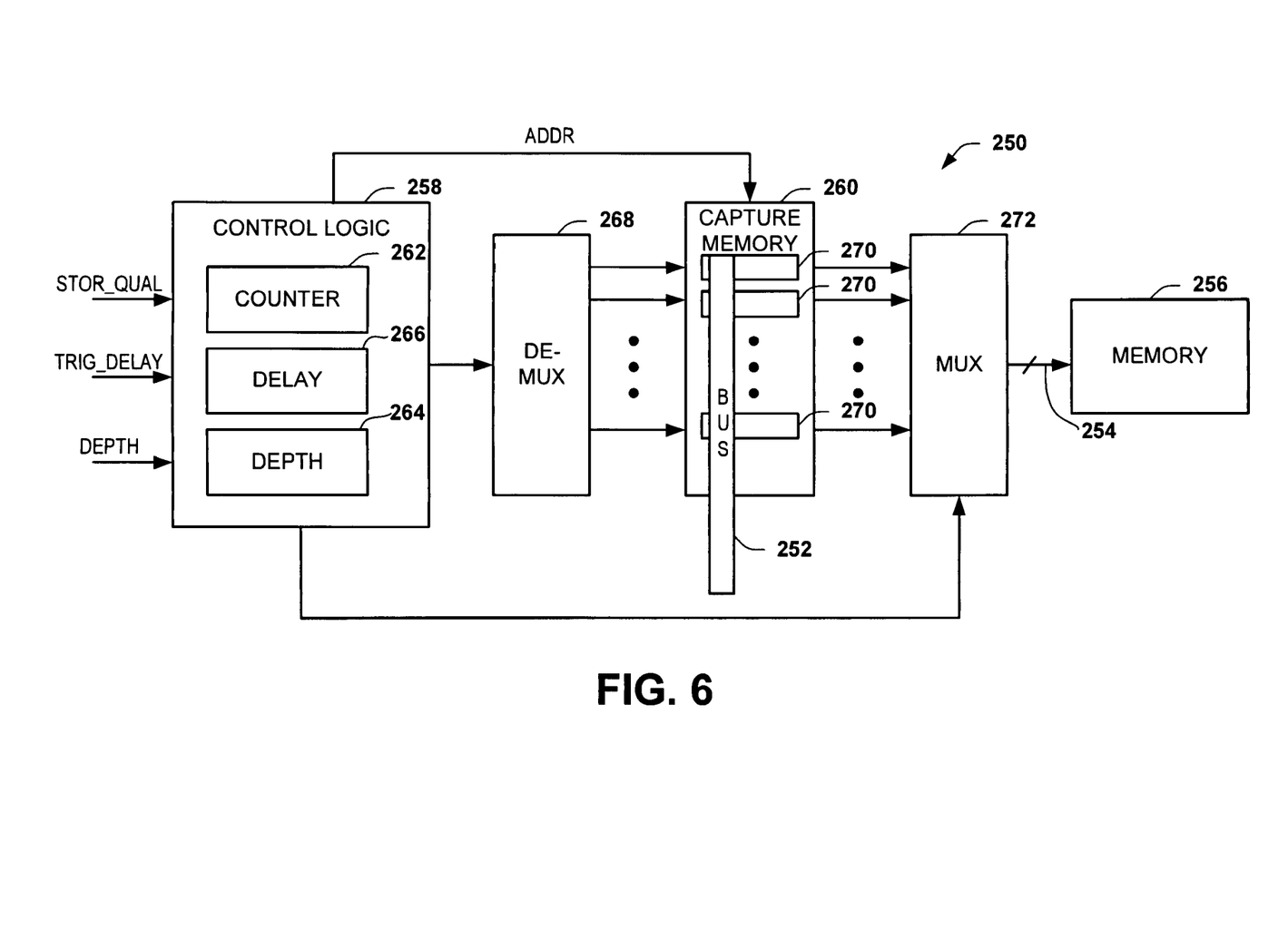
FIG. 6 depicts an embodiment of a data capture system.

FIG. 6 depicts an example of a data capture system 250 that can be utilized for storing data from a data bus (e.g., an observability or debug bus) 252. The data on the bus 252 may be logically partitioned to facilitate storing different parts of the data. For the example of an 80-bit debug bus 252, one portion of bus can include bits [39:0] and another portion of the bus can include bits [79:40]. Each of the bus portions can include any number of bits and that the bus can be separated into any component parts which can contain the same or different numbers of bits.

The data capture system 250 provides corresponding output data (e.g., a single or multi-bit data stream) 254 from the bus 252, which can be provided to an addressable memory field of associated memory 256. The memory 256 can be implemented as system addressable memory, such as a register array, or some other type of system memory in a computer system in which the data capture system 250 is being implemented. The data in the memory 256 can also be read from and stored in a non-volatile storage device (not shown), such as FLASH memory, EEPROM or a hard disk drive to name a few. The data capture system 250 provides the output data 254 based at least in part on a TRIG_DELAY signal (defining how data is captured relative to a trigger event) and the STOR_QUAL signal.

The data capture system 250 includes control logic 258 that is operative to control associated capture memory 260 for capturing or reading data from the bus 252. The control logic 258, for example, can include an arrangement of gates and other circuitry operative to capture data from the bus 252.

By way of example, the control logic 258 can include a counter 262 operative to control which data is read from the bus 252 and is written to the capture memory 260. The counter 262, for example, can be implemented as a multi-bit counter (e.g., an 11 bit counter) that maintains a count value that controls what data is to be captured from the data bus 252. Different portions of the multi-bit counter 262 can be employed for controlling different aspects of the system 250. For example, a set of bits (e.g., least significant bits) from the counter 260 can define an address of selected data on the bus 252 that are to be captured by memory modules (e.g., buffers) 270 in the capture memory 260. The control logic 258 thus can provide an address (ADDR) signal to the capture memory 260 that defines a corresponding address for data to be captured from the portion of the bus 252 associated with the memory modules 270.

Another set of bits from the counter 262 can be provided to a de-multiplexer (DE-MUX) 268 that provides a set of output signals based on the set of counter bits from the control logic 258. The de-multiplexer 268 is operative to drive a corresponding portion of the capture memory 260 for storing selected data from the data bus 252 in associated memory modules 270. For instance, the de-multiplexer 268 provides an enable signal to one or more of the memory modules 270 based on the control input from the control logic 258, corresponding to one or more bits (e.g., a portion of the most significant bits) from the counter 262 for selectively enabling the memory modules. As the counter 262 increments, the de-multiplexer 268 will enable each of the memory modules 270 in a corresponding sequence. The enabled memory module 270 is activated to read data from the bus 252 and to store such data in the memory module based on the address (ADDR) input. As mentioned above, the counter 260 can provide the ADDR input, such as corresponding to a set of least significant bits sufficient to encode the amount of data being propagated over the of the bus 252.

The memory modules 270 provide corresponding multi-bit inputs to output multiplexer (MUX) 272. The multiplexer 272 can also be controlled based on a control signal from the control logic, such as corresponding to some of the counter data corresponding to one or more bits (e.g., a portion of the most significant bits) from the counter 262. The control logic 258 can provide the same or different control signals to multiplexer 272 and the de-multiplexer 268. The multiplexer 272 provides the output data signal 254 according to which of the memory modules 270 is enabled during a given clock cycle. The output data signal 254 thus can be written to system addressable memory 256 and accessed via an associated processor for further analysis or for implementing other functions (e.g., fault control) within the computer system.

A depth control block 264 can be programmed via a DEPTH signal (e.g., stored in associated system addressable memory) to control the capture depth. The capture depth, for example, can set from which portion of the bus 260 data is to be stored for each qualified store event. For instance, in an 80 bit bus, the capture depth can set how many (and possibly which) of the 80 bits are to be captured for each qualified store event. By programming the DEPTH signal to one value, the data capture system 250 can be selectively configured to operate in a first mode that stores less data, but at a deeper level on the bus by capturing data from a larger portion of the bus (e.g., the entire bus) 252. In a second mode, the data capture system 250 can store more samples of data in the memory 256, but for a smaller portion (e.g., one-half) of the bus 252. The amount of data that is stored generally will vary depending on the size of the memory 256 relative to the capture depth. Those skilled in the art will understand and appreciate that other capture depths can be implemented by the depth control block 264.

The control logic 258 can also include a delay block 266 that controls when data is to be captured relative to a trigger delay (TRIG_DELAY) signal. For example, the control logic 258 receives the TRIG_DELAY signal from an associated delay system (e.g., the delay system 222 of FIG. 6). The TRIG_DELAY signal can be a single bit value that identifies when a predetermined number of store events (e.g., based on the STOR_QUAL signal) have occurred relative to a trigger signal asserting. The TRIG_DELAY signal alternatively could be a multi-bit signal. The associated delay system thus provides the TRIG_DELAY signal to control a window of data that is to be stored relative to a trigger event, such as described above with respect to FIG. 6. For example, the associated delay system can be programmed to implement a plurality of data stores from the bus 252 before a trigger event, after a trigger event or a window of stores that overlap with a trigger event. As mentioned above, a trigger event can occur in response to a trigger state machine entering a final state, such as in response to data propagated on the bus 252 meeting one or more conditions. Thus, the data capture system 250 is operative to continue capturing and storing data from the data bus 252 in response to the STOR_QUAL signal so long as the TRIG_DELAY signal does not assert. When the TRIG_DELAY signal asserts, for example, the control logic 258 can control the system 250 to turn off and stop storing data from the bus 252, effectively ending a capture session.

Figure 7:
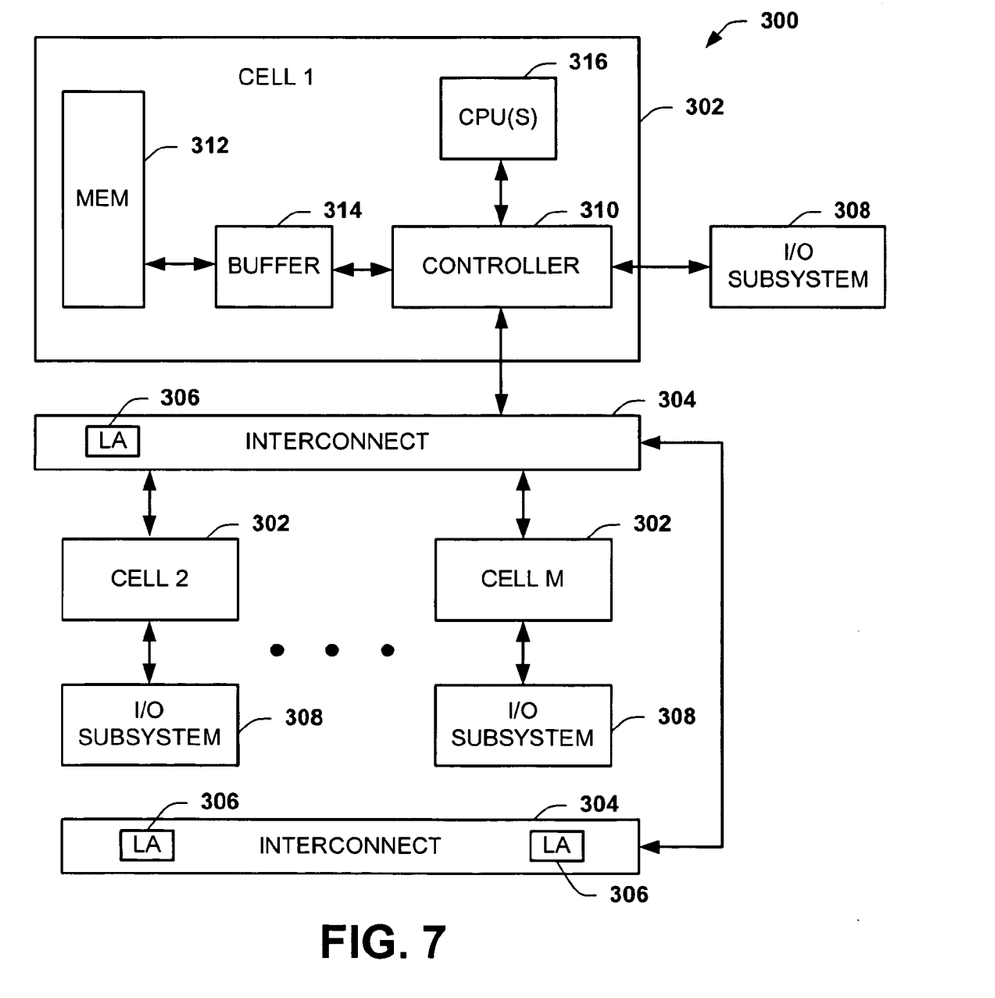
FIG. 7 depicts an example of a computer system that can implement one or more embodiments of logic analyzers.

FIG. 7 depicts a block diagram illustrating an example of a computer system 300, which can implement one or more logic analyzers, such as shown and described herein (e.g., FIGS. 1-6). The computer system 300 of FIG. 7 is depicted as a distributed-memory multi-processor system, although a single processor system can also utilize the logic analyzer. The system 300 includes a plurality of cells 302 indicated respectively at CELL 1, CELL 2 through CELL M, where M is an integer greater than or equal to one denoting the number of cells. Each of the cells 302, which can be implemented as a cell board, is communicatively coupled to other cells via an interconnect 304, such as a backplane or crossbar structure. Each of the interconnects 304 can be implemented as an application specific integrated circuit (ASIC).

In the example of FIG. 7, logic analyzers 306 are implemented within the interconnects 304; namely, one logic analyzer in a first interconnect and two logic analyzers in another interconnect. Those skilled in the art will understand and appreciate that any number of one or more logic analyzers can be implemented within the interconnects 304 as well as in other circuitry, including on integrated circuits in the cells 302 or I/O subsystems 308. By way of example, each logic analyzer 306 is coupled to a bus structure (e.g., an observability bus) that can be driven with data from components and other bus structures associated with one or more cells 302. Additionally, as described herein, each logic analyzer 306 can include memory addressable within the system 300, which can be read from or written two by components on any of the associated cells 302.

By way of further example, an I/O (input/output) subsystem 308 is associated with each of the cells 302. The I/O subsystem 308 can provide an interface or pathway for accessing an associated bus structure (e.g., a PCI bus structure) or other devices coupled to the corresponding bus structure, such as through corresponding adapter (not shown). Those skilled in the art will understand and appreciate various types of I/O devices 308 that can be accessed or can access memory via the I/O subsystem 308.

Additionally, the interconnect 304 that contains one logic analyzer 306 can be coupled to the other interconnect, which contains two logic analyzers, for accessing another cell-based architecture that includes one or more other cells (not shown). The other cell-based architecture can be similarly configured to that shown and described in FIG. 7. Those skilled in the art will understand and appreciate that the system 300, however, can be implemented with any number of cells, with any number of one or more logic analyzers being implemented.

For purposes of brevity, the internal contents are shown only for CELL 1, although those skilled in the art will understand and appreciate that each of the other respective cells 302 can be implemented in a similar manner. Alternatively, different configurations could also be implemented relative to the different cells 302.

Turning to the contents of CELL 1, CELL 1 includes a cell controller 310 coupled to a cell memory subsystem 312 through an associated buffer network 314. The buffer network 314 can include a queue (e.g., an input queue and an output queue) to provide intelligent buffering of requests and responses between the memory subsystem 312 and controller 310. One or more central processing units (CPUs) 316 are also connected to the controller 310 for accessing the memory subsystem 312. Each of the CPUs 316 can include an associated cache (not shown) for storing data for local access by the CPU without requiring access to the memory subsystem 312. In the arrangement shown in FIG. 7, the CPUs 316 and the I/O subsystem 306 each can be considered memory accessing devices operative to access data in the memory subsystem 312 via the controller 310. The controller 310 can include firmware, a configuration and status register (CSR) and an ordered access queue for accessing the data in the memory subsystem 312. The memory subsystem 312 can include any number of one or more memory modules, including one or more DIMM or SIMM memory devices.

When data is accessed by CPUs 316 and/or the I/O subsystem 306, the controller or other structures can drive selected portions or all of such data to the observability bus that is associated with one or more of the logic analyzers 306. The logic analyzers 306 can, in turn, monitor performance of the data on the associated observability bus, analyze data based on the performance conditions associated with the data and capture data based on the qualification of the data. The logic analyzer further can implement a state machine that includes one or more conditions that control state transitions and how a given data capture session proceeds, such as described herein.

It will be further appreciated that a data capture session for one or more of the logic analyzers 306 can be initiated and controlled programmatically by computer executable instructions running in one or more of the CPUs 316. Alternatively or additionally, a capture session can be initiated and controlled by a utility or a diagnostic tool. The utility or diagnostic tools, for example, can be run internally within a CPU 316 or externally as part of one of the I/O subsystems 308. Those skilled in the art will understand and appreciate various implementations of logic analyzers that can be employed in the computer system 300 in other types of complex electrical and computer systems (e.g., routers and other communications equipment) based on the teachings contained herein.

In view of the foregoing structural and functional features described above, certain methods will be better appreciated with reference to FIGS. 5 and 6. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., logic gates, such as including transistors, a digital signal processor, or application specific integrated circuit), software (e.g., as executable instructions running on one or more processors), or any combination of hardware and software.

Figure 8:
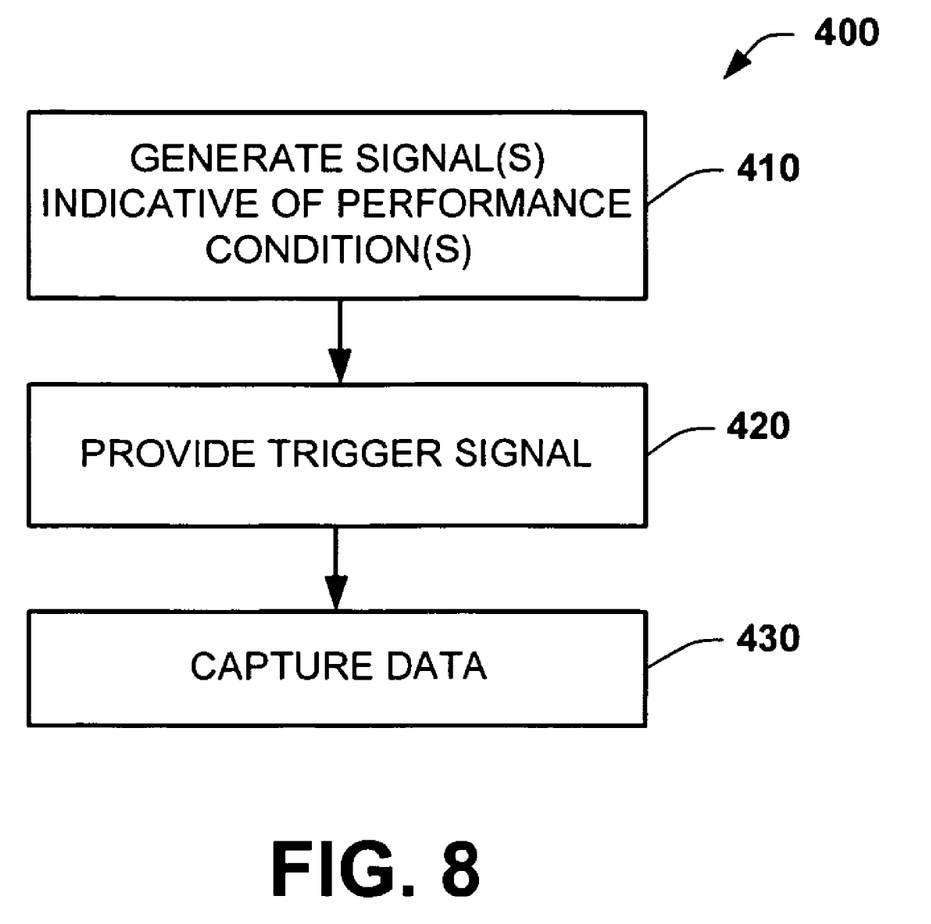
FIG. 8 is a flow diagram depicting an embodiment of a method for analyzing acquisition.

FIG. 8 depicts an example of a method 300. The method 300 includes generating at least one signal indicative of at least one performance condition associated with corresponding data on a bus, as shown at 310. An indication of performance for the corresponding data is adjusted based on the at least one signal. At 320, a trigger signal is provided as a function of the at least one signal. At 330, the data from the bus is captured based on the trigger signal.

What have been described above are examples of the present invention. It is, of course, not possible to describe every conceivable combination of components or methodologies for purposes of describing the present invention, but one of ordinary skill in the art will recognize that many further combinations and permutations of the present invention are possible. For example, any number of one or more logic analysis systems can be implemented in a given ASIC and any number of such ASICs can be integrated into a computer system. Accordingly, the present invention is intended to embrace all such alterations, modifications, and variations that fall within the spirit and scope of the appended claims.

What is claimed is:

1. An integrated circuit comprising:
a monitoring system that monitors data provided on a physical bus, the monitoring system comprising first condition circuitry that provides at least one signal as a function of at least one performance condition being met by at least some of the data provided on the physical bus, the monitoring system provides at least one output signal indicating a measure of performance for the at least some data and adjusts the at least one output signal based on the at least one signal that is provided by the first condition circuitry; and
an analysis system operative to perform logic analysis of the data on the physical bus as a function of the at least one signal, the analysis system providing at least one trigger signal that varies based on the logic analysis of the data on the physical bus to control capture of the data on the physical bus, wherein the analysis system comprises:
a trigger state machine comprising second condition circuitry configured to receive the at least one signal and compare the at least one signal to a condition in the second condition circuitry and control the trigger state machine to transition from a current state to a next of a plurality of available states based on the at least one signal.

2. The integrated circuit of claim 1, wherein the monitoring system provides the at least one signal as a plurality of signals as a function of corresponding data provided on the physical bus, the analysis system performing the logic analysis relative to the plurality of signals to provide the trigger signal.

3. The integrated circuit of claim 1, wherein the monitoring system comprises a plurality of performance monitoring subsystems that include the first condition circuitry, each of the plurality of performance monitoring subsystems monitoring a respective one of the at least one performance condition associated with at least some of the data provided on the physical bus and providing a respective condition signal as a function of the data on the physical bus, the analysis system performing the logic analysis as a function of the respective condition signals.

4. The integrated circuit of claim 1, wherein the second condition circuitry includes comparator circuitry configured to compare masking data to the at least one signal according to the current state of the trigger state machine.

5. The integrated circuit of claim 1, comprising an occurrence system that is operative to set a number of occurrences that a condition associated with the second condition circuitry must meet before transitioning to the next of the plurality of states for the condition.

6. The integrated circuit of claim 1, wherein the logic analysis is programmable to define conditions associated with the second condition circuitry.

7. A computer system comprising the integrated circuit of claim 1.

8. The integrated circuit of claim 1, the at least one output signal being provided from the monitoring system to a system addressable memory that is configured to program at least one desired function to be performed relative to the data provided on the physical bus.

9. The integrated circuit of claim 2, further comprising a data capture system operative to store data from the physical bus based on the trigger signal.

10. The integrated circuit of claim 3, wherein the plurality of performance monitoring subsystems provide the at least one output signal, each of the plurality of performance monitoring subsystems comprising an associated counter having a counter value that varies based on the respective condition signal, each of the counter values providing a measure of performance of the at least one performance condition associated with the at least some of the data provided on the physical bus that is monitored by a respective one of the plurality of performance monitoring subsystems.

11. The integrated circuit of claim 5, wherein the occurrence system comprises a counter that provides an indication of a number of occurrences that the condition associated with the second condition circuitry has met, the trigger state machine enabling a transition from the current state to the next of the plurality of states for the condition when the value indicative of the number of occurrences reaches the set number of occurrences.

12. The integrated circuit of claim 9, wherein the analysis system further comprises a trigger delay system that provides a trigger delay signal based on the trigger signal and a qualification signal, a capture session being defined according to the trigger delay signal.

13. The integrated circuit of claim 12, further comprising a qualification system that provides the qualification signal as a function of at least one qualification condition relative to at least one of the plurality of signals, the data capture system being activated to store the data from the physical bus based on at least one of the trigger signal, the qualification signal and the trigger delay signal.

14. A logic analysis system integrated into an integrated circuit, comprising:
- a monitoring system that includes first condition circuitry that provides a plurality of signals, each of the plurality of signals having a value that varies as a function of corresponding data provided on an associated physical bus, the monitoring system adjusting an indication of performance associated with at least some of the corresponding data provided on the associated physical bus based on at least one of the respective plurality of signals;
- an analysis system operative to perform logic analysis as a function of the plurality of signals and to provide a trigger signal based on the logic analysis that is performed as a function of the plurality of signals, the trigger signal defining a capture session, wherein the analysis system comprises:
  - a trigger state machine comprising second condition circuitry configured to receive the plurality of signals and compare at least one signal of the plurality of signals to at least one condition in the second condition circuitry; and
  - an occurrence system configured to set a number of occurrences for a condition associated with the plurality of signals to control transitions of the trigger state machine among a plurality of states, wherein the trigger signal is provided based on the current state; and
- a data capture system operative to store data from the associated physical bus for the capture session based on the trigger signal.

15. The logic analysis system of claim 14, further comprising a qualification system that provides a qualification signal as a function of at least one qualification function performed relative to at least one of the plurality of signals, the data capture system being operative to store the data from the associated physical bus based on at least one of the qualification signal and the trigger signal.

16. The logic analysis system of claim 14, further comprising a delay system that provides a trigger delay signal, the data capture system controlling storage of the data for the capture session based on the trigger delay signal.

17. The logic analysis system of claim 14, wherein the monitoring system comprises a plurality of performance monitoring and counter systems that include the first condition circuitry, each of the plurality of performance monitoring and counter systems monitoring a respective performance condition associated with at least some data provided on the physical bus and providing a corresponding condition signal as a function of the data on the physical bus, the respective corresponding condition signals being aggregated to form the plurality of signals.

18. The logic analysis system of claim 14, wherein the occurrence system further comprises a counter that provides an indication of a number of occurrences that the condition associated with the plurality of signals has met, the trigger state machine enabling a transition from the current state to the next state for the condition when the indication of the number of occurrences reaches the set number of occurrences.

19. A computer system comprising at least one logic analysis system according to claim 14.

20. The logic analysis system of claim 17, wherein each of the plurality of performance monitoring and counter systems further comprises an associated counter that has a counter value that varies based on the respective condition signal to provide the indication of performance.

21. An integrated circuit comprising:
- means for providing a plurality of signals indicative of corresponding performance conditions based on corresponding data received via a physical observability bus and for providing at least one indication of performance that is adjusted based on at least one of the plurality of signals; and
- means for analyzing the plurality of signals to determine conditions of the corresponding data on the physical observability bus and for providing a trigger signal to control capture of data from the physical observability bus based on the plurality of signals, wherein the means for analyzing comprises:
  - means for transitioning among a plurality of states as a function of the plurality of signals and for providing an indication of a current state, the trigger signal being provided based on the indication of the current state, wherein the means for transitioning comprises:
    - means for receiving the plurality of signals and controlling the means for transitioning to transition from the current state to a next of the plurality of states in response to the plurality of signals.

22. The integrated circuit of claim 21, further comprising means for capturing the data from the physical observability bus based on the trigger signal.

23. The integrated circuit of claim 22, further comprising means for qualifying data for capture by the means for capturing based on at least one of the plurality of signals.

24. The integrated circuit of claim 21, wherein the means for providing a plurality of signals further comprises:
- means for evaluating performance conditions associated with selected data received via the physical observability bus and for providing the plurality of signals based on the evaluation of each of performance conditions; and
- means for providing an indication for a number of occurrences in which each of at least some of the performance conditions are met, the indication being adjusted based on the plurality of signals associated with each of the at least some of the performance conditions.

25. The integrated circuit of claim 21, wherein the means for analyzing further comprises means for setting a number of occurrences that a condition associated with the plurality of signals must meet before transitioning to a next state for the condition.

26. The integrated circuit of claim 21 further comprising means for programming at least one of the means for providing and the means for analyzing.

27. A method integrated into an integrated circuit, comprising:
- generating at least one signal via first condition circuitry, the at least one signal indicative of at least one performance condition associated with corresponding data on a physical bus;
- adjusting an indication of performance for the corresponding data on the physical bus based on the at least one signal;
- receiving the at least one signal at second condition circuitry;
- comparing the at least one signal to a condition in the second condition circuitry to obtain a comparison result;
- transitioning from a current state to a next of a plurality of states in response to the comparison result;
- providing an indication of the current state;
- providing a trigger signal as a function of the at least one signal and the indication of the current state; and
- controlling the capture of the data from the physical bus based on the trigger signal.

28. The method of claim 27, wherein the at least one signal comprises a plurality of signals, each of the plurality of signals providing an indication of performance associated with selected data on the physical bus.

29. The method of claim 28, comprising:
  evaluating the corresponding data on the physical bus relative to a plurality of respective performance conditions, each of the plurality of signals being generated based on evaluation data selected from the corresponding data on the physical bus; and
  adjusting a counter based on each of the plurality of signals to provide an indication of performance for each of the respective performance conditions.

30. The method of claim 27, further comprising:
  setting a number of occurrences associated with a conditional branch of a state machine that implements the transitioning; and
  transitioning to a next state for the conditional branch of the state machine after the number of occurrences has been met.

31. The method of claim 27, further comprising setting a value for a trigger delay that defines a capture session to control when the data from the physical bus is captured relative to at least one of the trigger signal and another trigger event.

32. The method of claim 27, further comprising qualifying data for capture such that the capturing of the data from the physical bus is controlled based on the trigger signal and the qualification of the data.

33. The method of claim 30, further comprising programming at least one vector that defines the plurality of states and associated transitions that can occur among the plurality of states.

* * * * *